Feb. 10, 1959 L. J. GREINER ET AL 2,873,437
VEHICLE BACK-UP WARNING SIGNAL ACTUATOR
Filed Dec. 31, 1957 2 Sheets-Sheet 1
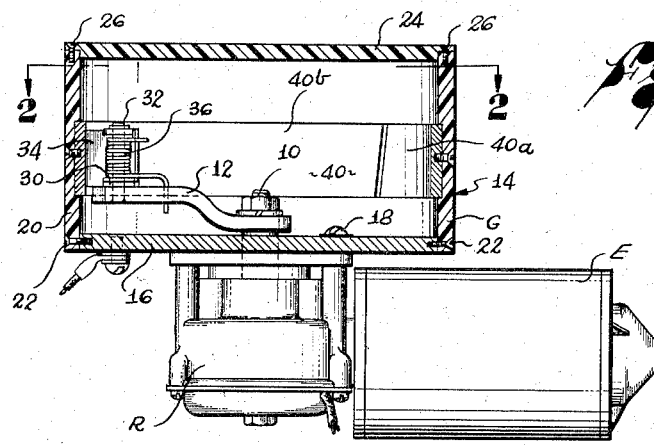
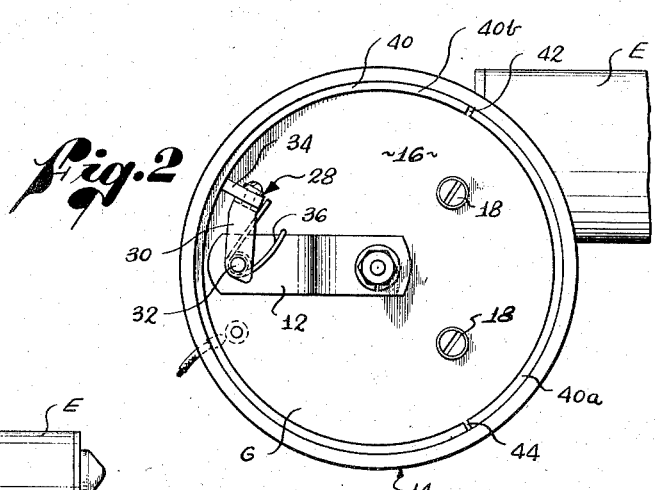
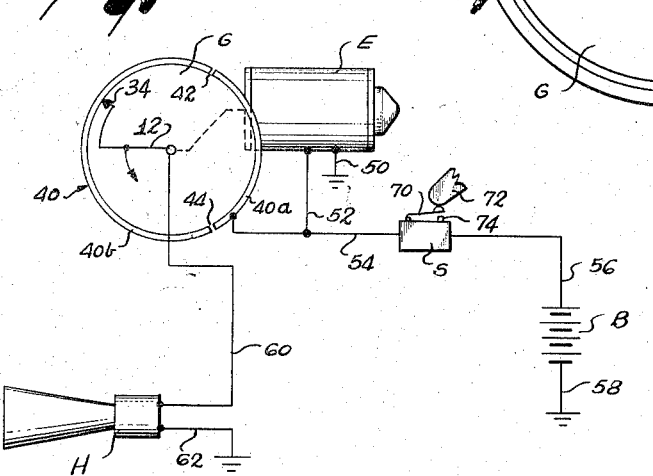
INVENTORS
LEROY J. GREINER
DONALD L. EBBAGE
BY Fulwider Mattingly & Huntley
Attorneys

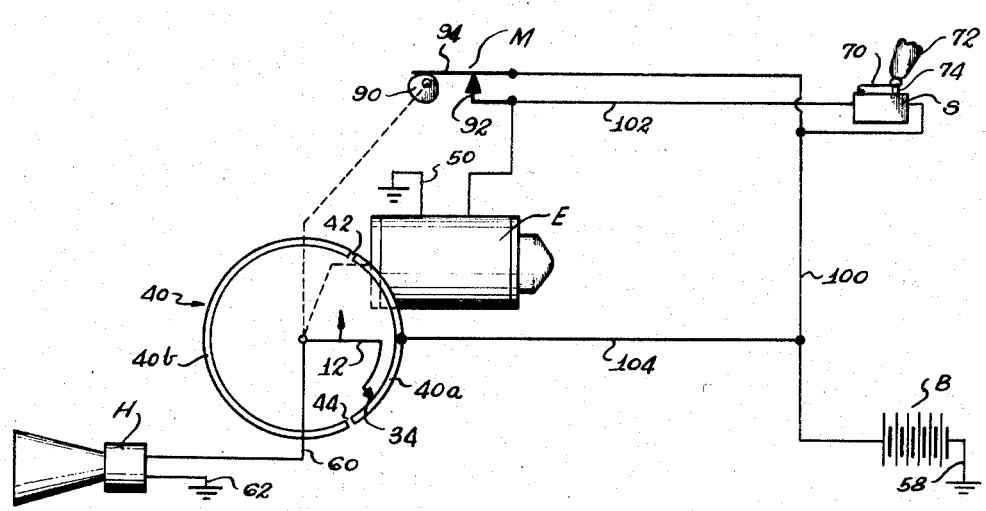
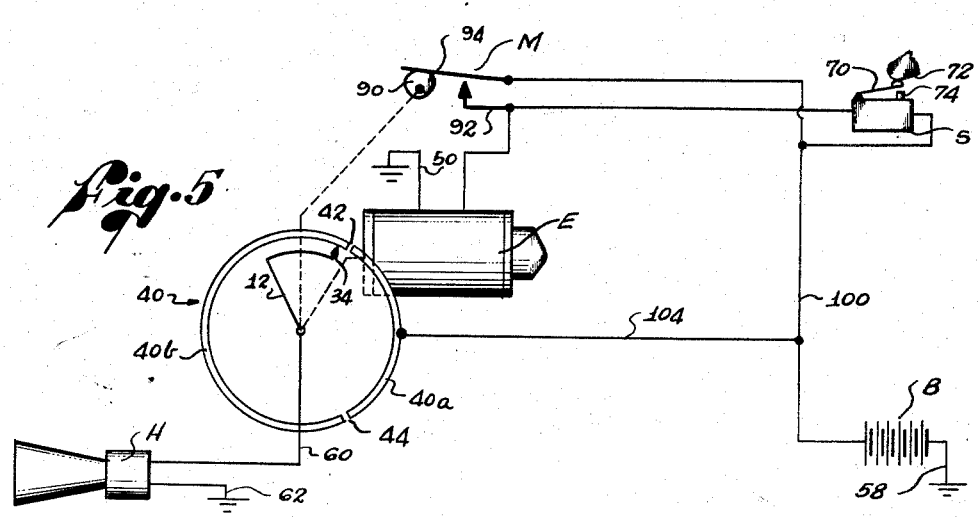

United States Patent Office 2,873,437
Patented Feb. 10, 1959

2,873,437

VEHICLE BACK-UP WARNING SIGNAL ACTUATOR

Leroy J. Greiner, Long Beach, and Donald L. Ebbage, Paramount, Calif., assignors to Macco Corporation, Paramount, Calif., a corporation of California Application December 31, 1957, Serial No. 706,417

4 Claims. (Cl. 340—70)

The present invention relates generally to warning devices and more particularly to a signal actuator for a back-up warning device usable with vehicles such as trucks, tractors, heavy equipment, and the like. In the trucking, transportation and construction industries, it is important and often required by law that a vehicle be equipped with a warning device indicating rearward movement of the vehicle. Such devices are particularly desirable where the driver's rearward field of vision is limited or obstructed. Several back-up warning devices have been heretofore proposed for such purposes. These heretofore-proposed devices, however, have failed to meet with widespread operation, nor have they been sufficiently rugged as to withstand continued use.

It is a major object of the present invention to provide a vehicle back-up warning signal actuator which is extremely foolproof in construction and operation.

Another object of the invention is to provide a signal actuator of the aforedescribed nature which may be readily installed upon existing vehicles without requiring other than minor modifications of such vehicles.

Yet a further object of the present invention is to provide a vehicle back-up warning signal actuator that is compact in size and light in weight and does not interfere with the normal operation of the vehicle with which it is employed.

An additional object of the invention is to provide a signal actuator of the aforedescribed nature which is simple of design and rugged of construction utilizing a minimum number of working parts whereby it will provide a long and useful service life.

Yet a further object of the invention is to provide a signal actuator of the aforedescribed nature which is inexpensive to construct and maintain.

It is an important object of the present invention to provide a vehicle back-up warning signal actuator which does not require a direct mechanical connection between the vehicle's engine or its power train and accordingly affords considerable flexibility with regard to its positioning upon the vehicle.

Another important object is to provide a signal actuator of the aforedescribed nature that utilizes an electric motor of comparatively low amperage requirements, switch means, and a warning signal device of comparatively high amperage requirements, with the switch means being required to handle only low amperage electric current.

These and other objects and advantages of the present invention will become apparent from the following detailed description when taken in conjunction with the appended drawings wherein:

Figure 1 is a side elevational view, taken partly in vertical section, showing a preferred embodiment of a vehicle back-up warning signal actuator embodying the present invention;

Figure 2 is a horizontal sectional view taken on line 2—2 of Figure 1;

Figure 3 is a diagrammatic view showing a first form of electric circuit which may be employed with said signal actuator; and Figures 4 and 5 are diagrammatic views showing a second form of electric circuit which may be employed with said signal actuator.

Referring to the drawings, the preferred form of vehicle back-up warning signal actuator embodying the present invention includes a signal generator G which is coupled to an electric motor E by means of a reduction gear box R. The construction of both the electric motor E and the reduction gear box R is conventional and the details of such construction are not within the scope of the present invention. The signal generator G is connected to a suitable warning device, such as a horn H, while the signal generator and the electric motor E are both adapted to be connected to a suitable source of electric current, such as the battery B of the vehicle with which the device is employed. A back-up switch S is interposed between the current source B and the motor E and signal generator G.

More particularly, the output shaft 10 of the reduction gear box G is non-rotatably affixed to a rotor arm 12. This rotor arm 12 is disposed within a cylindrical housing, generally designated 14. The housing 14 includes a flat annular base 16 which is affixed to the upper end of the reduction gear box R by a plurality of fastening members, such as bolts 18. The outer periphery of the base 16 is affixed to the lower end of a sleeve 20 by means of a plurality of fastening members, such as bolts 22. The upper end of the sleeve 20 is closed by a flat annular closure element 24. This closure element is removably held in place by a plurality of bolts 26. While the base 16 may be of metallic construction, the sleeve 20 and the cover 24 will preferably be formed of a material which does not conduct electric current.

The free end of the rotor arm 12 carries a brush member 28. This brush member 28 includes a bifurcated bracket 30, one end of which is pivotally supported by an upstanding pin 32. The pin 32 is affixed to the free end of the rotor arm 12. The opposite end of the bracket 30 carries a wiper element 34. The wiper element 34 is constantly biased radially outwardly relative to the housing 14 by means of a conventional torsion spring 36.

The wiper element 34 is adapted to wipe along a conductor ring 40 during rotation of the rotor arm 12. This conductor ring 40 is non-continuous and includes a conducting segment 40a and a non-conducting segment 40b. These two segments are separated by slots 42 and 44.

Referring now to Figure 3, one side of the windings of the electric motor E are connected to ground by a conductor 50. The other side of the motor windings are connected to a conductor 52. The latter conductor 52 is connected to a lead 54. One end of this lead 54 is connected to the conducting segment 40a of the conductor ring 40. The opposite end of this lead 54 is connected to one side of the switch S. The other side of the switch S is connected to a second lead 56. The opposite side of this lead 56 is connected to the positive side of the electric current source B. The negative side of the electric current source B is connected to ground by a lead 58. The rotor arm 12 and its wiper element 34 are connected to a lead 60. The opposite side of the lead 60 is connected to one of the terminals of the warning device H. The other terminal of this device H is connected to ground by a lead 62.

With continued reference to Figure 3, the back-up switch S is disposed adjacent an element of the power train of the vehicle. In practice, it has been found satisfactory to mount this switch in such a manner that its arm 70 will be engaged by an element 72 on the reverse lever of the vehicle's gear shifting mechanism so as to depress the switch plunger 74 at such time as the lever 72 is moved into a position which effects reverse movement of the vehicle. During forward movement of the vehicle, however, the switch arm 70 will be spaced from the switch plunger 74 whereby the back-up switch S will be normally maintained open.

In the operation of the aforedescribed apparatus, the back-up switch S will remain open during forward movement of the vehicle. Accordingly, no current will flow from the current source B to the electric motor E, nor to the signal generator G. When, however, the reverse lever is moved into position for effecting reverse movement of the vehicle, the element 72 of such lever will engage the switch arm 70 so as to depress the switch plunger 74. The switch S will then be closed. Electric current from the source B will then energize the electric motor E and thereby effect rotation thereof. Rotation of the electric motor E will in turn effect rotation of the output shaft 10 and will effect concurrent rotation of the rotor arm 12. As the wiper element 34 of the brush member 28 passes over the non-conducting segment 40b of the conductor ring 40, no current will flow between conductor 54 and conductor 60. During the time that the wiper element 34 passes over the conducting segment 40a of the conductor ring 40, however, current may flow between the electric current source B and the warning device H. This device will thereupon produce an audible signal. The frequency of this signal will depend upon the speed of rotation of the output shaft 12 and the length of the conducting segment 40a of the conductor ring 40 as compared to the non-conducting segment 40b thereof. The signal thus produced will provide an audible warning for anyone located rearwardly of the vehicle.

Referring now to Figures 4 and 5, there is shown a second form of electric circuit which may be employed with the back-up warning device embodying the present invention. This second form of circuit includes in addition to the back-up switch S, a motor control switch M. The motor control switch M is operated by a cam 90 which is driven by the motor E in a suitable manner. The motor control switch M is of the make-and-break type and includes a fixed contact 92 and a movable contact 94. The movable contact 94 of the motor control switch M and the plunger 74 of the back-up switch S are connected to the non-grounded pole of the current source B by a first lead 100. The fixed contact 92 of the motor control switch and the switch arm 70 of the back-up switch S are connected to the non-grounded side of the windings of the electric motor E by a second lead 102. As was the case with the circuit of Figure 3, the opposite side of the windings of the electric motor E are connected to ground by a conductor 50, while the opposite pole of the current source B is connected to ground by a lead 58. The conducting segment 40a of the conductor ring 40 is connected to the first lead 100 by a lead 104. The rotor arm 12 and its wiper element 34 are connected to one side of the terminals of the warning device H by a lead 60, as in the case of the circuit of Figure 3. Additionally, the other terminal of the warning device H is connected to ground by a lead 62.

In the operation of the aforedescribed embodiment of the invention, the back-up switch S will remain open during forward movement of the vehicle. Accordingly, no current will flow from the current source B to the electric motor E. When, however, the vehicle's reverse lever is moved into position for effecting reverse movement of the vehicle its element 72 will cause the arm 70 to depress the switch plunger 74 and thereby close the back-up switch S, as shown in Figure 4. Electric current from the source B will then energize the electric motor E and thereby effect rotation thereof. During such rotation the cam 90 will also be rotated so as to successively open and close the motor control switch M. The opening and closing of this latter switch however, will have no effect on the operation of the motor E, since even while the motor control switch M is open current will flow to the non-grounded side of the windings of the motor E through the leads 100 and 102.

Rotation of the electric motor E will in turn effect rotation of the rotor arm 12. As the wiper element 34 of this rotor arm passes over the non-conducting segment 40b of the conductor ring 40, no current will flow to the warning device H. During the time that the wiper element 34 passes over the conducting segment 40a of the conductor ring, however, current will flow between the electric current source B and the warning device H by means of the first lead 100 and lead 104. The warning device will thereupon produce an audible signal.

Referring now to Figure 5 at such time as reverse movement of the vehicle is halted the back-up switch S will be opened. It will be apparent that should the electric motor E stop rotating with the rotor's wiper element 34 positioned upon the conducting segment 40a of the conductor ring 40, the warning device H would continue to produce a signal. In order to avoid this contingency it is necessary to provide means for effecting movement of the wiper element 34 onto the non-conducting segment 40b of the conductor ring. Such means takes the form of the motor control switch M. Thus, as will be clear from the preceding description this motor control switch M is in parallel with the back-up switch S. Accordingly, electric current will continue to flow to the electric motor so long as either switch is closed. When the back-up switch S is opened, however, the motor control switch M will continue to permit current to flow to the motor E only while its movable contact 94 is engaged with its fixed contact 92. The cam 90 is so arranged that it will permit the movable contact 94 to remain engaged with the fixed contact 92 only so long as the rotor's wiping element 34 is disposed upon the conducting segment 40a of the conductor ring. This will be apparent from Figure 4. As shown in Figure 5, however, as soon as the wiping element 34 passes off the conducting segment 40a onto the non-conducting segment 40b, the cam 90 will lift the movable contact 94 away from the fixed contact 92 so as to effect the opening of the motor control switch M. At this time the flow of electric current to the electric motor E will be cut off. This condition will exist until such time as the back-up switch S is again closed. Electric current will then flow from the source B to the electric motor E so as to effect rotation thereof.

The aforedescribed arrangement of Figures 4 and 5 makes it possible to employ a back-up switch S having a lower current conducting capacity that is possible with the arrangement of Figure 3. This is true since the electric current required to operate the warning device H need only flow through the first lead 100, lead 104, the conducting segment 40a of the conductor ring, the rotor 12 and the lead 60. The conducting ring 40 and the wiper element 34 should have comparatively wide contacting surfaces. In this manner, it is possible to provide a non-arcing device having a maximum service life and which will remain extremely foolproof in operation even though subjected to rough handling. The electric current required to operate the motor E is considerably less than that required to operate the warning device H.

Although the warning device H is indicated as being a horn it may assume various other forms without departing from the invention. Thus, a bell or gong could be used, either singly or in conjunction with a warning light. The aforedescribed signal actuator has proven to be particularly rugged and fool-proof in operation, requiring a minimum of attention once it has been installed. Its operation does not depend upon any controlled activity of the vehicle operator. Instead, it will provide a signal automatically during any reverse movement of the vehicle.

While there has been shown and described hereinbefore what is presently considered to be the preferred embodiment of the present invention, it will be apparent that various modifications and changes may be made thereto without departing from the spirit of the invention or the scope of the following claims.

We claim:

1. In a vehicle back-up warning system that includes an element movable when the vehicle is to be reversed, a source of electric current, an electric motor that drives a signal generator, a warning device, conductor means connecting said signal generator with said source of electric current and with said warning device, second conductor means connecting said electric motor with said source of electric current, and a back-up switch interposed in said second conductor means, said switch being open during forward motion of the vehicle with said element effecting the closing of said switch when the vehicle is to be reversed, the combination of: a motor control switch interposed in said second conductor means in parallel with said back-up switch; and means driven by said electric motor for successively opening and closing said motor control switch during operation of said electric motor whereby electric current will flow to said electric motor so long as either said back-up switch or said motor control switch is closed and upon opening of said back-up switch said electric motor will continue to operate until it has effected opening of said motor control switch.

2. In a vehicle back-up warning system that includes an element movable when the vehicle is to be reversed, a source of electric current, a warning device an electric motor, and a back-up switch that is open during forward movement of the vehicle with said element effecting the closing of said switch when the vehicle is to be reversed, the combination of: a signal generator including a rotor arm that is driven by said electric motor, a wiper carried by the free end of said rotor arm and a non-continuous conductor ring engaged by said wiper; conductor means connecting said signal generator with said source of electric current and with said warning device; second conductor means connecting said electric motor with said source of electric current; a motor control switch interposed in said second conductor means in parallel with said back-up switch, said back-up switch also being interposed in said second conductor means; and means driven by said electric motor for successively opening and closing said motor control switch during operation of said electric motor whereby electric current will flow to said electric motor so long as either said back-up switch or said motor control switch is closed and upon opening of said back-up switch said electric motor will continue to operate until it has effected opening of said motor control switch.

3. In a vehicle back-up warning system that includes an element movable when the vehicle is to be reversed, a source of electric current, an electric motor driving a shaft, a warning device, a back-up switch that is open during forward motion of the vehicle with said element automatically effecting the closing of said switch when the vehicle is to be reversed, the combination of: a signal generator having a housing, a rotor arm in said housing and coupled to said shaft, a wiper carried by the free end of said rotor arm, and a conductor ring on said housing that is engaged by said wiper with said conductor ring including a non-conducting segment and a conducting segment; conductor means connecting said conducting segment and rotor arm to said warning device and to said source of electric current; second conductor means connecting said electric motor with said source of electric current, said back-up switch being interposed in said second conductor means; a motor control switch interposed in said second conductor means in parallel with said back-up switch; and means driven by said electric motor maintaining said motor control switch closed while said wiper is engaged with said conducting segment and said motor control switch open while said wiper is engaged with said non-conducting segment.

4. In a vehicle back-up warning system that includes an element movable when the vehicle is to be reversed, a source of electric current, a warning device, an electric motor driving a shaft, and a back-up switch that is open during forward motion of the vehicle with said element effecting the closing of said back-up switch when the vehicle is to be reversed, the combination of: a signal generator having a housing, a rotor arm in said housing and coupled to said shaft, a wiper carried by the free end of said rotor arm, and a conductor ring on said housing that is engaged by said wiper with said conductor ring including a non-conducting segment and a conducting segment; conductor means connecting said conducting segment and rotor arm to said warning device and to said source of electric current; second conductor means connecting said electric motor with said source of electric current, said back-up switch being interposed in said second conductor means; a motor control switch of the make-and-break type interposed in said second conduit means in parallel with said back-up switch; and a cam driven by said electric motor to operate said motor control switch, said cam being arranged to maintain said motor control switch closed while said wiper is engaged with said conducting segment and open while said wiper is engaged with said non-conducting segment.

References Cited in the file of this patent

UNITED STATES PATENTS

| | | |
|---|---|---|
| 1,469,337 | Sanborn | Oct. 2, 1923 |
| 2,232,822 | Homsher | Feb. 25, 1941 |
| 2,790,934 | Wheatley | Apr. 30, 1957 |
| 2,829,213 | Brett | Apr. 1, 1958 |